May 19, 1931.   R. J. LANGER   1,806,473
WATERING BOWL
Filed May 25, 1929
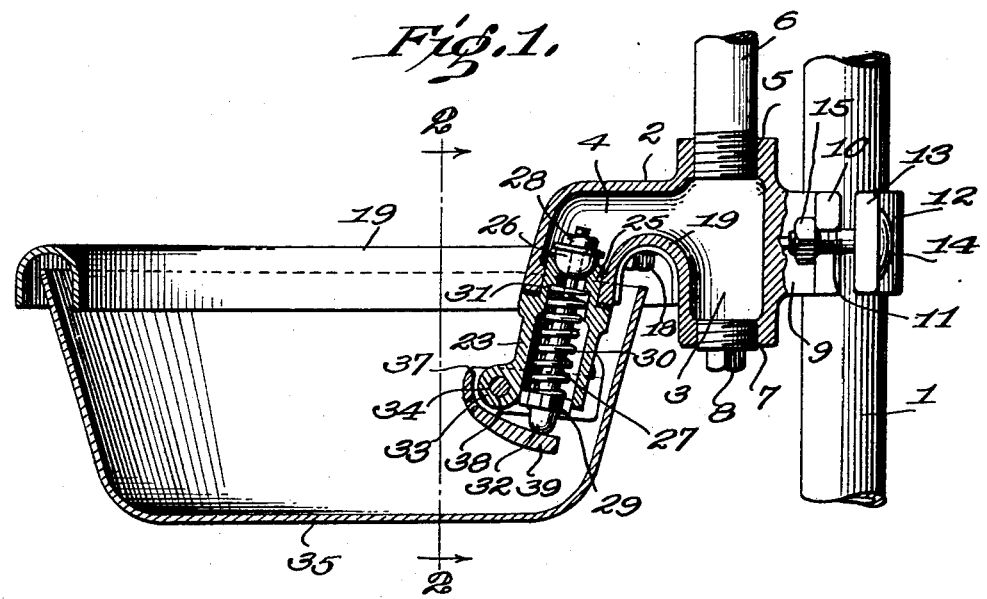
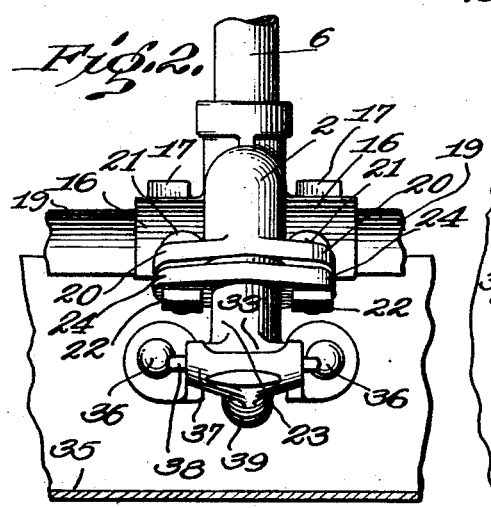
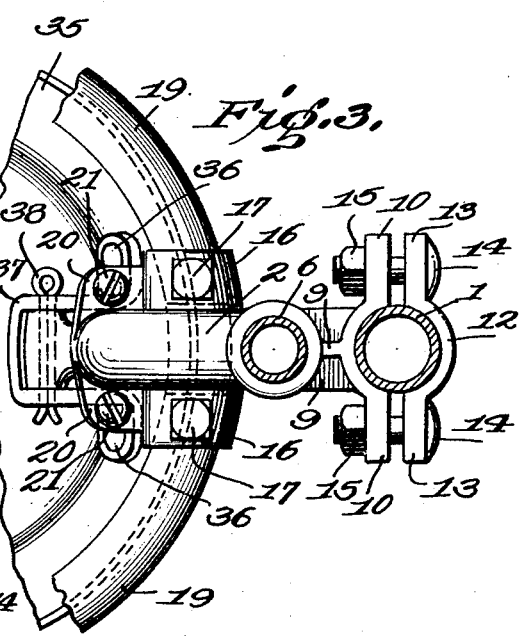
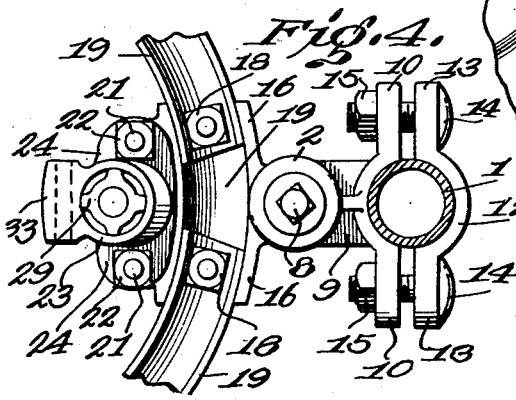
Inventor
Rudolph J. Langer
By Milano & Milano
Attorney Patented May 19, 1931

1,806,473

UNITED STATES PATENT OFFICE

RUDOLPH J. LANGER, OF MONTICELLO, IOWA, ASSIGNOR TO FRANKLIN EQUIPMENT COMPANY, OF MONTICELLO, IOWA, A CORPORATION

WATERING BOWL

Application filed May 25, 1929. Serial No. 365,972.

My invention relates to new and useful improvements in watering bowls and more particularly to such a device for watering cattle, the principal object of the invention residing in the provision of a construction which will be kept in a sanitary condition at all times and which may be readily operated by the animal.

Another object of the invention resides in the provision of novel means for supporting the bowl whereby the same is adapted for slight swinging movement when engaged by the nose of the animal to control the operation of the water inlet valve, the bowl being provided with a tongue or lip portion adapted to engage with the end of the valve stem to open the valve when pressure is applied to the bowl, the valve being returned to its normal or closed position, when the bowl is released, by a coiled spring or similar means.

Still another object of the invention consists in the provision of a novel form of casting which is used as a part of the means for connecting the bowl to a support, as means for supporting the valve housing or casing, said valve housing or casing including means for supporting the bowl, and as means for supporting a ring which is adapted to extend around and over the upper edge of the bowl to act as a protecting means for the nose and head of the animal.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a longitudinal vertical section through the bowl, supporting casting and valve, with parts shown in elevation.

Fig. 2 is a transverse vertical section on the line 2—2 of Fig. 1 looking in the direction of the arrows.

Fig. 3 is a fragmental top plan with parts shown in horizontal section; and

Fig. 4 is a fragmental bottom plan with the bowl removed.

My improved form of watering bowl is primarily intended to be positioned in a barn or similar structure for use by cattle and will preferably be supported by a post or standard positioned adjacent a "stanchion" so as to be within easy reach of the animal who controls the supply of water to the bowl by operation of the bowl due to the contact of the animal's nose therewith.

In the drawings 1 indicates the supporting post or standard and at 2 I have shown my novel form of casting provided interiorly with the chamber 3 and passage 4 leading therefrom. At the top the casting is provided with the interiorly threaded opening 5 leading to the chamber 3, to receive the threaded end of a water supply pipe 6. At the bottom the casting is provided with the interiorly threaded opening 7, in alignment with the opening 5, which is normally closed by means of a plug 8. By removing the plug 8 the interior of the casting and more particularly the chamber 3 thereof may be cleaned. Formed on and extending from one vertical face of the casting 2 is an arm 9 provided on its outer end with the outwardly directed lugs or projections 10 each of which is provided with a slot 11 for a purpose which will be later apparent. The outer end of the arm 9 is also curved, as shown more particularly in Figs. 3 and 4 of the drawings, to fit around the post or standard 1. At 12 I have shown a clamping plate having the outwardly directed lugs or projections 13 which extend parallel with the lugs or projections 10, each of the lugs or projections 13 being provided with an opening through which a bolt 14 is adapted to pass. The bolts 14 also extend through the slots 11 of the lugs or projections 10 and nuts 15 are received on the ends of the bolts to draw the clamping plate 12 and the end of the arm 9 into close holding engagement with the post or standard 1, it being understood that the plate 12 is provided with a recess in its inner face to conform to the curvature of the post or standard.

Extending from each side of the casting 2 is an inverted U-shaped flange or projection 16 to which are connected, by means of the bolts 17 and nuts 18, the ends of an inverted U-shaped ring 19. As shown more particularly in Figs. 3 and 4 of the drawings the ends of the ring will be spaced apart and the under surface of the casting, adjacent the flanges or projections 16, is curved as shown at 19 so as to form, with the flanges or projections 16, a continuous channel.

At the outer end of the passage 4 the casting 2 is formed with the outwardly directed flanges or projections 20, each having an opening through which a bolt 21 may pass. Secured to the casting 2, by means of the bolts 21 and nuts 22, is the valve housing or casing 23 provided adjacent its upper end with outwardly directed flanges or projections 24 which extend parallel with the flanges or projections 20. These flanges or projections 24 have openings, aligning with the openings in the projections or flanges 20 through which the bolts 21 may readily pass. The upper end of the valve casing or housing 23 is provided with the reduced extension 25 which extends into the lower end of the passage 4, as shown more particularly in Fig. 1 and the upper end of this reduced extension 25 forms a seat for the valve 26 which is secured to the valve stem 27 by means of the nut 28. Adjacent the lower end the valve stem 27 is provided with the notched or recessed flange 29 which slides within the casing or housing and surrounding the valve stem is a coiled spring 30 which normally holds the valve 26 in closed position upon its seat. The lower end of the spring engages the flange 29 and the upper end engages the shoulder 31 formed interiorly of the reduced extension 25. As shown, also more particularly in Fig. 1, the lower end of the valve stem is in the form of a knob or projection 32, the surface of which is rounded, and projects below the end of the valve housing or casing for a purpose which will be later apparent. Formed at the lower end of the valve casing or housing 23 is an enlargement 33 having a transversely extending opening 34 therein.

The bowl to receive the water is shown at 35 and the upper edge thereof extends into the bottom recess of the ring 19 as shown. Secured interiorly of the bowl 35, by means of the rivets 36 or similar fastenings, is a bracket 37 which is adapted to cooperate with the enlargement 33 on the end of the valve casing or housing 23 to pivotally connect the bowl. A cotter pin or similar fastening 38 extends through the bracket 37 and through the opening 34 so as to connect the bowl to the valve housing or casing and allow the same to have swinging movement relative thereto. The bracket 37 is also provided with the inwardly directed lip or projection 39 which underlies and engages the knob 32 of the valve stem 37.

From the above detailed description it is thought that the construction and operation of my device will be clearly understood. As has been previously stated the bowl is primarily intended for watering cattle and may be readily supported in a barn or similar structure by means of a post or standard 1 or other suitable support. Water is supplied through the inlet pipe 6 and the valve 26 is opened when the animal engages his nose with the bowl 35. The engagement of the animal's nose with the bowl 35 swings the bowl on the pivot pin 38 and causes the inner end of the lip or projection 39 to raise and in turn raise the valve stem 27 and valve 26 against the action of the coiled spring 30. When the animal withdraws his nose from the bowl the bowl is returned to its normal or original position, as well as the valve 26, by the expansion of the coiled spring 30. It will be seen that I have provided a novel construction and one in which the bowl may be maintained in a perfectly sanitary condition at all times and there are no projections, shoulders or the like, around which impurities might lodge. At the same time there are no obstructions or sharp edges or the like which would cause injury to the animal, the ring 19 overlying the upper edge of the bowl forming a guard and preventing operation of the bowl by engagement of the animal's mouth or nose with the upper edge. In other words the animal must place his nose within the bowl for operation to admit the water.

Having fully described my invention what I claim as new and desire to secure by Letters Patent is:

1. A watering device of the character described including a support, a casting connected to the support, a valve housing connected to the casting, a valve operable in the housing, a bowl pivotally connected to the valve housing and adapted to operate the valve, and an inverted U-shaped ring secured to the casting and extending around the upper edge of the bowl with the edge of the bowl within the ring.

2. A watering device of the character described including a support, a casting connected to the support, a valve housing connected to the casting, a valve operable in the housing, a bowl, a bracket connected to the bowl, means engageable with the bracket for pivotally connecting the bowl to the valve housing, and means for operating the valve upon movement of the bowl.

3. A watering device of the character described including a support, a casting connected to the support, a valve housing connected to the casting, a valve operable in the housing, a bowl, a bracket connected to the bowl, means engageable with the bracket for pivotally connecting the bowl to the valve housing, and a lip formed on the bracket and engageable with the valve for operating the same upon movement of the bowl.

4. A watering device of the character described including a support, a valve housing carried by the support, an outwardly extending projection formed on the housing, a valve operable within the housing, a bowl, a bracket secured interiorly of the bowl, and means passing through the bracket and valve housing projection for pivotally connecting the bowl to the housing.

5. A watering device of the character described including a support, a valve housing carried by the support, an outwardly extending projection formed on the housing, a valve operable within the housing with one end projecting therefrom, a bowl, a bracket secured within the bowl, a projection formed on the bracket and normally extending in a position to engage the projecting end of the valve, and means passing through the bracket and valve housing projection for pivotally connecting the bowl to the housing, the valve being operated through the bracket projection upon movement of the bowl.

In testimony whereof I hereunto affix my signature.

RUDOLPH J. LANGER.